United States Patent
Tsao et al.

(10) Patent No.: US 10,366,266 B2
(45) Date of Patent: Jul. 30, 2019

(54) FINGERPRINT SENSING DEVICE, ELECTRONIC DEVICE AND CALIBRATION METHOD FOR FINGERPRINT SENSOR

(71) Applicant: Acer Incorporated, New Taipei (TW)

(72) Inventors: Po-Chun Tsao, New Taipei (TW); Hsu-Hsiang Tseng, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 196 days.

(21) Appl. No.: 15/673,423

(22) Filed: Aug. 10, 2017

(65) Prior Publication Data

US 2018/0232555 A1 Aug. 16, 2018

(30) Foreign Application Priority Data

Feb. 14, 2017 (TW) .............................. 106104760 A

(51) Int. Cl.
G06K 9/00 (2006.01)
(52) U.S. Cl.
CPC ....... *G06K 9/00013* (2013.01); *G06K 9/0002* (2013.01); *G06K 9/00087* (2013.01)
(58) Field of Classification Search
CPC ............. G06K 9/00013; G06K 9/0002; G06K 9/00087
See application file for complete search history.

(56) References Cited

U.S. PATENT DOCUMENTS

| 9,152,841 B1 | 10/2015 | Riedijk | |
| 2006/0147096 A1* | 7/2006 | Lee | G06K 9/00067 382/124 |
| 2008/0172725 A1* | 7/2008 | Fujii | G06F 21/32 726/5 |
| 2012/0085822 A1 | 4/2012 | Setlak et al. | |
| 2015/0022670 A1* | 1/2015 | Gozzini | G06K 9/0002 348/187 |

(Continued)

FOREIGN PATENT DOCUMENTS

| CN | 101253512 | 8/2008 |
| CN | 105700757 | 6/2016 |
| CN | 105809093 | 7/2016 |

(Continued)

*Primary Examiner* — John B Strege
(74) *Attorney, Agent, or Firm* — JCIPRNET

(57) ABSTRACT

A fingerprint sensing device, an electronic device, and a calibration method for a fingerprint sensor are provided. The calibration method includes following steps: obtaining an initial environment value while the fingerprint sensor performs initial environmental calibration, and determining whether the initial environment value is in a default environment range or not; determining whether the initial environment value is in one of a plurality of statistical ranges when the initial environment value is not in the default environment range, wherein each of the statistical ranges is obtained statistically by a plurality of fingerprint data of one of a plurality of categories; and, when the initial environment value is in a target statistical range, calibrating the fingerprint sensor according to a target value and an environment default value, wherein the target value corresponds to the target statistical range, and the environment default value corresponds to the default environment range.

10 Claims, 3 Drawing Sheets

(56) References Cited

U.S. PATENT DOCUMENTS

2017/0140233 A1* 5/2017 Andersson ............. G06K 9/209
2018/0101711 A1* 4/2018 D'Souza ................ G06F 21/32

FOREIGN PATENT DOCUMENTS

| TW | M260800 | 4/2005 |
| TW | 200517977 | 6/2005 |
| TW | 201413596 | 4/2014 |

* cited by examiner

FINGERPRINT SENSING DEVICE, ELECTRONIC DEVICE AND CALIBRATION METHOD FOR FINGERPRINT SENSOR

CROSS-REFERENCE TO RELATED APPLICATION

This application claims the priority benefit of Taiwan application serial no. 106104760, filed on Feb. 14, 2017. The entirety of the above-mentioned patent application is hereby incorporated by reference herein and made a part of this specification.

BACKGROUND OF THE INVENTION

1. Field of the Invention

The present invention relates to a fingerprint recognition technique, and in particular to a fingerprint sensing device, an electronic device and a calibration method for a fingerprint sensor.

2. Description of Related Art

Devices which often use the fingerprint sensing technology are usually safes, consumption type electronic devices (mobile phones, tablet computers and personal computers) and the like for personal use, and the fingerprint sensing technology is also being applied gradually in applications, such as vehicles and door locks, to gradually replace conventional keys or electronic door cards. The current fingerprint recognition technology can be implemented in many ways. At present, the commonly used fingerprint recognition technique is the optical sensing technique or the capacitive sensing technique, and moreover, the distinguishing rate and accuracy of the fingerprint recognition technology have been more increased as the technology matures.

When started to operate, a fingerprint recognition device will normally detect or calibrate the value of a surrounding environment. Thus, when a user puts a fingerprint on a fingerprint sensor, the interference of the environment on the fingerprint sensor can thereby be reduced. However, when the fingerprint recognition device is performing environmental detection or calibration, if the user has put his/her finger on the sensor of the fingerprint recognition device at this moment, errors will occur in the detection of the fingerprint recognition device on an environment value, causing the environment value to be far different from an originally preset environment parameter. When this situation happens, a fingerprint sensing device will perform environmental detection or calibration again, or even worse, it may cause the whole fingerprint sensing device to shut down.

SUMMARY OF THE INVENTION

The present invention provides a fingerprint sensing device, an electronic device and a calibration method for a fingerprint sensor, which can directly determine whether the finger of a user has been put on the fingerprint sensor or not when the fingerprint sensor performs initial environmental calibration. Thus, the case that a fingerprint sensing function cannot operate because an environment value cannot be detected when initial environmental calibration is performed can be prevented.

The electronic device of the present invention comprises a fingerprint sensor and a processor. The processor is coupled with the fingerprint sensor. When the electronic device is started and the fingerprint sensor performs initial environmental calibration, the fingerprint sensor senses an initial environment value, and the processor determines whether the initial environment value is in a default environment range or not. When the initial environment value is not in the default environment range, the processor determines whether the initial environment value is in one of a plurality of statistical ranges or not. Each statistical range is obtained statistically by a plurality of fingerprint data of one of a plurality of categories. When the initial environment value is in one target statistical range among these statistical ranges, the processor calibrates the fingerprint sensor according to a target value corresponding to the target statistical range and an environment default value corresponding to the default environment range.

The calibration method for a fingerprint sensor in the present invention includes the following steps: when the fingerprint sensor performs initial environmental calibration, obtaining an initial environment value, and determining whether the initial environment value is in a default environment range or not; when the initial environment value is not in the default environment range, determining whether the initial environment value is in one of a plurality of statistical ranges or not, wherein each statistical range is obtained statistically by a plurality of fingerprint data of one of a plurality of categories; and when the initial environment value is in one target statistical range among these statistical ranges, calibrating the fingerprint sensor according to a target value corresponding to the target statistical range and an environment default value corresponding to the default environment range.

The fingerprint sensing device of the present invention comprises a fingerprint sensor and a processor. The processor is coupled with the fingerprint sensor. When the fingerprint sensing device is started and performs initial environmental calibration, the fingerprint sensor senses an initial environment value, and the processor determines whether the initial environment value is in a default environment range or not. When the initial environment value is not in the default environment range, the processor determines whether the initial environment value is in one of a plurality of statistical ranges or not, wherein each statistical range is obtained statistically by a plurality of fingerprint data of one of a plurality of categories. When the initial environment value is in one target statistical range among these statistical ranges, the processor calibrates the fingerprint sensor according to a target value corresponding to the target statistical range and an environment default value corresponding to the default environment range.

Based on the above, when the fingerprint sensing device, the electronic device and the calibration method for a fingerprint sensor described in the embodiments of the present invention perform initial environmental calibration, if the initial environment value is not in the estimated value range, then whether the finger of the user is placed on the fingerprint sensor or not can still be determined through the plurality of statistical ranges generated from collected human fingerprint information of each category. If the initial environment value sensed by the fingerprint sensor is in one of these statistical ranges, it is indicated that the user has put his/her finger on the fingerprint sensor indeed. Therefore, the embodiments of the present invention can calibrate the fingerprint sensor according to the statistical range covering the initial environment value, so that the fingerprint sensor can instantly determine a fingerprint pattern after the initial environmental calibration. That is, if the fingerprint sensor described in the embodiments of the present invention is arranged on a power button of the electronic device, the user can simultaneously carry out the dual functions of "starting the electronic device" and "performing fingerprint recognition" after pressing the power button.

To make the aforementioned features and advantages of the present invention more comprehensible, embodiments accompanied with drawings are described in detail below.

DESCRIPTION OF THE EMBODIMENTS

Figure 1:
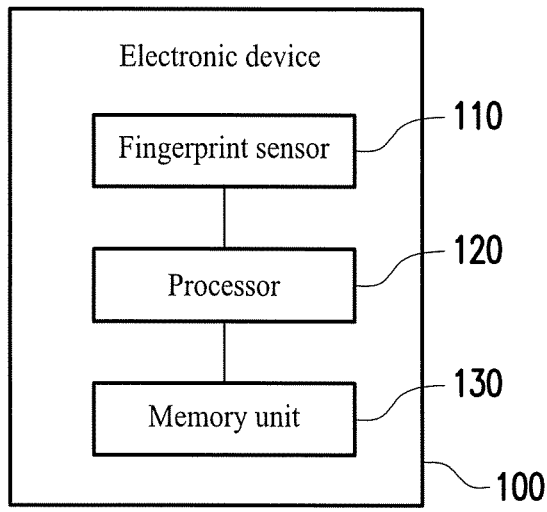
FIG. 1 is a schematic diagram of an electronic device according to one embodiment of the present invention.

FIG. 1 is a schematic diagram of an electronic device 100 according to one embodiment of the present invention. As shown in FIG. 1, the electronic device 100 mainly comprises a fingerprint sensor 110 and a processor 120. The electronic device 100 can be a consumption type electronic device (a mobile phone, a tablet computer or a personal computer), an automobile electronic device, an electronic door lock device or the like. Those which apply the present embodiment can apply a fingerprint sensing technique according with the embodiments of the present invention into a variety of devices according to their requirements.

The fingerprint sensor 110 can be a capacitive fingerprint sensor or an optical fingerprint sensor. The processor 120 can be an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor or other electronic units executing specific tasks. In the present embodiment, the fingerprint sensor 110 and the processor 120 can be different components, or can be integrated into the same fingerprint sensing chip. The fingerprint sensor 110 can be a component on the surface of the fingerprint sensing chip, such as a metal layer or a glass or plastic substrate. In part of the embodiments, the fingerprint sensor 110 and the processor 120 can be called a fingerprint sensing device.

The electronic device 100 may also comprise a memory unit 130, which is coupled to the processor 120 to store related information, for example, digital information contents such as a pre-collected and calculated fingerprint database and statistical ranges related to these statistical information. The processor 120 may access the data in the memory unit 130, and may implement a calibration method described in the embodiments of the present invention through the fingerprint sensor 110. The memory unit 130 can be a non-volatile memory, such as a high-speed cache.

Figure 2:
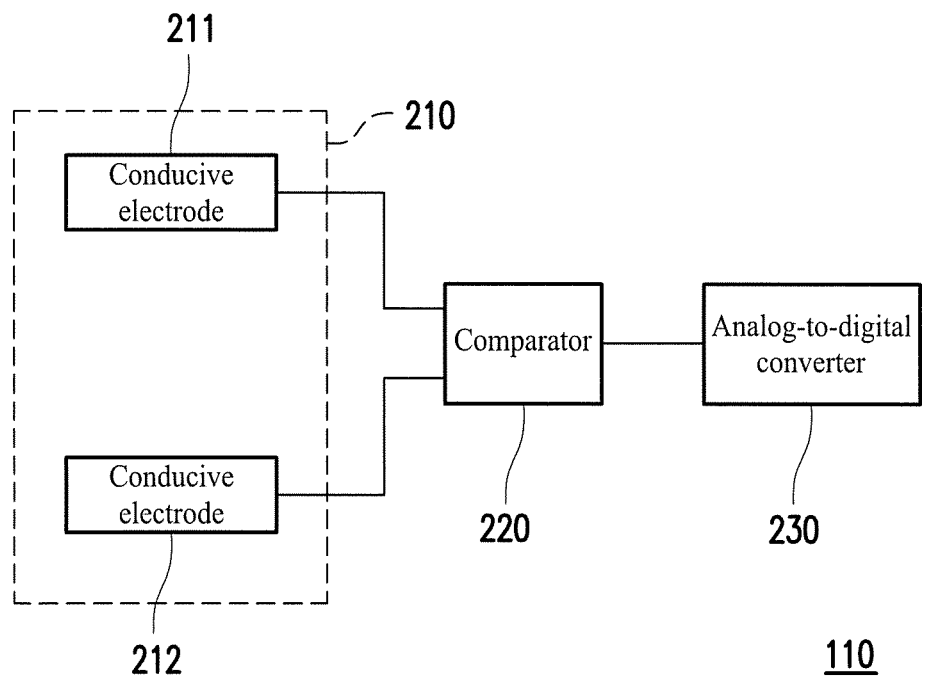
FIG. 2 is a functional block diagram of a fingerprint sensor of FIG. 1.

The circuit structure of the fingerprint sensor 110 can refer to FIG. 2. FIG. 2 is a functional block diagram of the fingerprint sensor 110 of FIG. 1. The fingerprint sensor 110 can comprise at least two conductive electrodes 211 and 212, a comparator 220 and an analog-to-digital converter 230. The conductive electrodes 211 and 212 are respectively arranged on both sides of a sensing area 210, and the conductive electrodes 211 and 212 are connected to the two input ends of the comparator 220. When the finger of a user is put in the sensing area 210, since the finger has impedance, a variation in a capacitance or current value will exist correspondingly, and therefore the comparator 220 can generate a sensed analog signal. The analog-to-digital converter 230 converts the sensed analog signal outputted by the comparator 220 into a digital sensed value.

Figure 3:
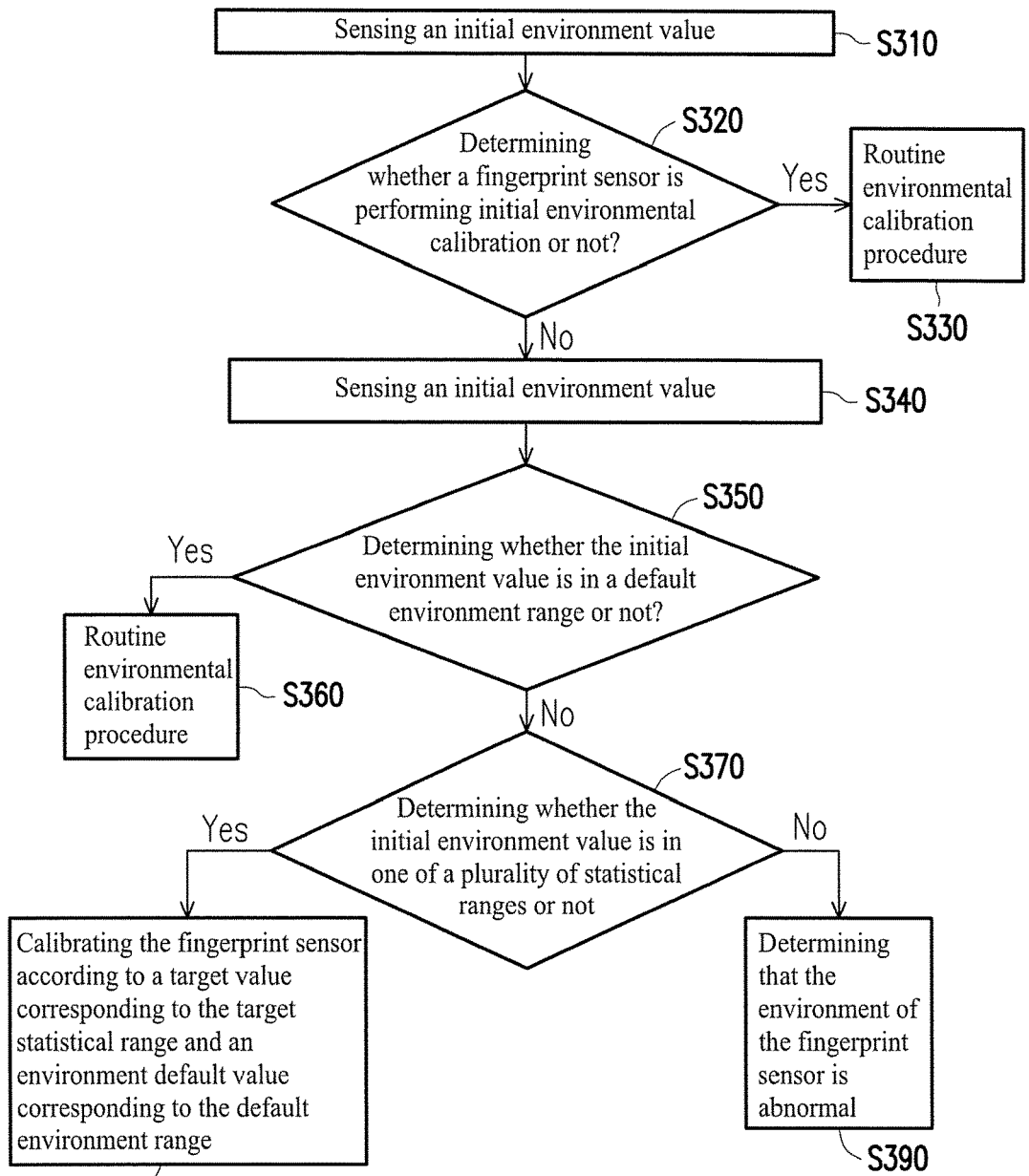
FIG. 3 is a flow diagram of a calibration method for a fingerprint sensor according to one embodiment of the present invention.

FIG. 3 is a flow diagram of a calibration method for a fingerprint sensor according to one embodiment of the present invention. The calibration method in the present embodiment is applicable to the electronic device 100 with the fingerprint sensor 110 in FIG. 1. Please refer to both FIG. 1 and FIG. 3, in Step S310, when the electronic device 100 is started, the fingerprint sensor 110 starts to be calibrated. In Step S320, the processor 120 determines whether the fingerprint sensor 110 is performing initial environmental calibration or not. If the fingerprint sensor 110 is not performing initial environmental calibration, then get into Step S330 from Step S320 to carry out a routine environmental calibration procedure. Reversely, if the fingerprint sensor 110 is performing initial environmental calibration, then get into Step S340 from Step S320, and the fingerprint sensor 110 senses an initial environment value in the sensing area 210 of FIG. 2.

Figure 4:
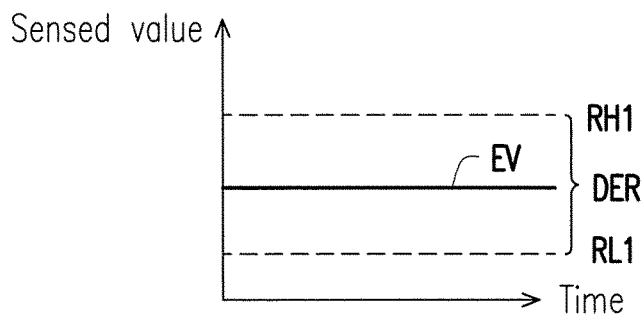
FIG. 4 is a schematic diagram of an environment default value and a fingerprint sensor value of a default environment range.

In Step S350, the processor 120 determines whether the initial environment value is in a default environment range. FIG. 4 is a schematic diagram of an environment default value EV and a fingerprint sensor value of a default environment range DER. The fingerprint sensor 110 will normally have an environment default value EV (500 in the present embodiment). That is, when there are no other foreign matters in the sensing area 210 of FIG. 2 or there is no environmental interference, the detected sensed value should approximate to 500. Therefore, in this normal service environment, the sensed value which is 500 will be set as the environment default value EV, moreover, an acceptable default environment range DER is thereby set, for example, the upper limit RH1 of the default environment range DER is set as 700, and the lower limit RL1 of the default environment range DER is set as 300.

Thus, under the affection caused by the reasonable change (such as a rise/drop in atmospheric temperature) of the environment, as long as the actual value sensed by the fingerprint sensor 110 is in the default environment range DER, a detected reference value in the fingerprint sensor 110 can be regulated dynamically so as to increase the accuracy of sensing. That is, if the detected reference value is determined, the fingerprint sensor 110 can subtract the detected reference value from the detected value, consequently, the interference of the environment is prevented, and the accuracy of fingerprint sensing is increased. Therefore, please return to FIG. 3, if the initial environment value is in the default environment range DER, the processor 120 performs the routine calibration procedure in Step S360.

However, if the initial environment value is not in the default environment range DER, then get into Step S370 from Step S350, and the processor 120 determines whether the initial environment value is in one of a plurality of statistical ranges or not. The embodiments of the present invention will collect various categories of fingerprint information in advance, for example, fingerprint data of a lot of Asian males, European females or people in an age range from 18 to 25 years old are collected, moreover, galvanic skin response (GSR) conditions of the different types of human beings are known from these fingerprint data, and thereby sensed value ranges of the different types of human beings on the fingerprint sensor 110 are known. The abovementioned "categories" can be differentiated by one or a combination of race, sex and age.

Figure 5:
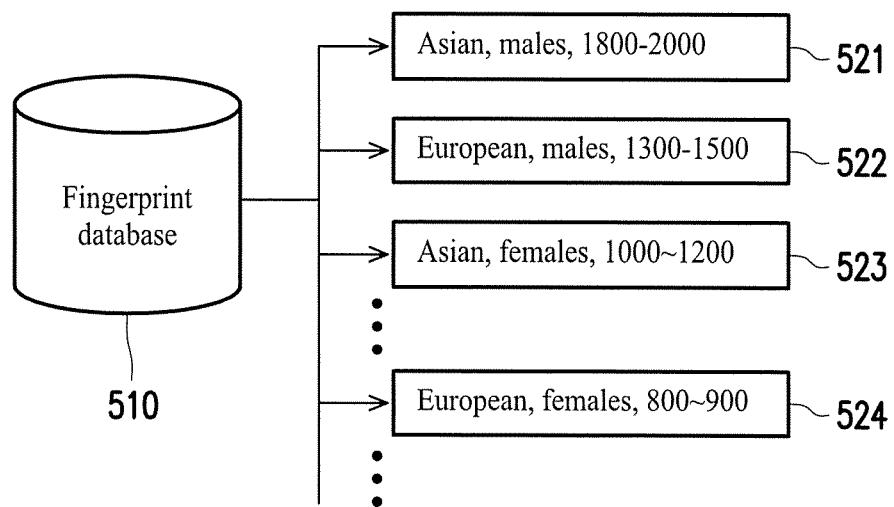
FIG. 5 is a schematic diagram of a fingerprint database and a plurality of statistical range data.

FIG. 5 is a schematic diagram of a fingerprint database 510 and a plurality of statistical range data 511-514. Please refer to FIG. 5, all these statistical range data 511-514 are obtained by collecting interval statistics from values sensed by the fingerprint sensor 110 of FIG. 2. For example, the statistical range data 521 represent that fingerprint sensed values of Asian males fall between 1800 and 2000; the statistical range data 522 represent that fingerprint sensed values of European males fall between 1300 and 1500; the statistical range data 523 represent that fingerprint sensed values of European females fall between 1000 and 1200; and the statistical range data 524 represent that fingerprint sensed values of European females fall between 800 and 900; In the present embodiment, the value ranges of these statistical range data 511-514 do not overlap one another.

Figure 6:
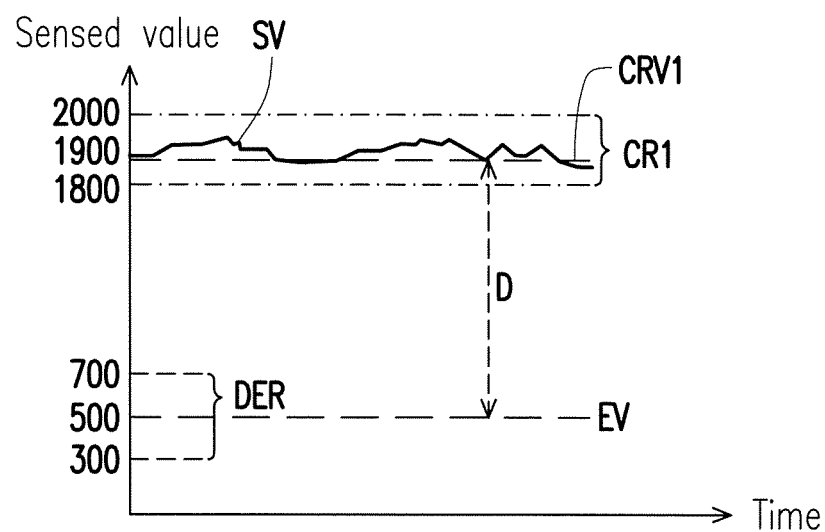
FIG. 6 is a schematic diagram of a fingerprint sensor value when it is assumed that all initial environment values are between 1800 and 2000.

Thus, return to Step S370 of FIG. 3, if the initial environment value is in one of these statistical ranges, it can be roughly known whether the finger of the user has been put in the sensing area of the fingerprint sensor in the initial calibration procedure. It is described here in company with the content drawn in FIG. 6. FIG. 6 is a schematic diagram of a fingerprint sensor value when it is assumed that all initial environment values are between 1800 and 2000. The environment default value EV is 500 units, while all actual sensed values SV (represented by a solid line) detected by the fingerprint sensor 110 of FIG. 1 are in a statistical range from 1800 to 2000 in the statistical range data 521 of FIG. 5. Here, a target statistical range CR1 is adopted as the statistical range from 1800 to 2000 corresponding to the statistical range data 521.

Known from FIG. 6, all the sensed data detected by the fingerprint sensor 110 are not in the default environment range DER but in the target statistical range CR1. That is, if an initial environment value (i.e. an actual sensed value SV) is in one target statistical range CR1 among these statistical range, then the processor 120 of FIG. 1 calibrates the fingerprint sensor 110 according to a target value CRV1 (for example, an average value 1900 of the target statistical range CR1) corresponding to the target statistical range CR1 and an environment default value (such as 500) corresponding to the default environment range DER. Specifically, the processor 120 will determine that the finger of an Asian male is put in the sensing area of the fingerprint sensor 110, consequently, a difference D value (i.e. 1900−500=1400) between the target value CRV1 (1900) corresponding to the target statistical range CR1 and the environment default value EV (500) corresponding to the default environment range DER is adopted as a detected reference value after calibration, and thereby the sensed value of the fingerprint sensor 110 is calibrated. That is, after calibration, after the difference value D (1400) is subtracted from all the values detected by the fingerprint sensor 110, the interference of the environment can be eliminated, and thereby a fingerprint pattern can be instantly determined after initial environmental calibration.

Thus, when the fingerprint sensor described in the embodiments of the present invention and the related calibration technique are arranged and applied on a power button of the electronic device, the user can simultaneously carry out the dual functions of "starting the electronic device" and "performing fingerprint recognition" after pressing the power button.

Return to Step S370 of FIG. 3. If all the initial environment values are not in the default environment range DER and are not in these statistical ranges (such as 800-900, 1000-1200, 1300-1500 and 1800-2000), the processor 120 will determine that the environment of the fingerprint sensor 120 is abnormal, and a screen or a sounder arranged in the electronic device 100 will remind the user, making the user notice whether the environment near the sensing area of the fingerprint sensor 110 interferes with sensing.

Based on the above, when the fingerprint sensing device, the electronic device and the calibration method for a fingerprint sensor described in the embodiments of the present invention perform initial environmental calibration, if the initial environment value is not in the estimated value range, then whether the finger of the user has been placed on the fingerprint sensor or not can still be determined through the plurality of statistical ranges generated from collected human fingerprint information of each category. If the initial environment value sensed by the fingerprint sensor is in one of these statistical ranges, it is indicated that the user has put his/her finger on the fingerprint sensor indeed. Therefore, the embodiments of the present invention can calibrate the fingerprint sensor according to the statistical range covering the initial environment value, so that the fingerprint sensor can instantly determine a fingerprint pattern after the initial environmental calibration.

Although the present invention has been disclosed according to the embodiments as above, the embodiments are not used to limit the present invention. Any person with common knowledge in the art can make some alterations and embellishment without departing from the spirit and scope of the present invention, so the protection scope of the invention shall be subject to the definition of the attached claims

What is claimed is:

1. An electronic device, comprising:
a fingerprint sensor; and
a processor, coupled with the fingerprint sensor,
wherein when the electronic device is started and the fingerprint sensor performs initial environmental calibration, the fingerprint sensor senses an initial environment value, and the processor determines whether the initial environment value is in a default environment range or not,
when the initial environment value is not in the default environment range, the processor determines whether the initial environment value is in one of a plurality of statistical ranges or not, wherein each statistical range is obtained statistically by a plurality of fingerprint data of one of a plurality of categories, and
when the initial environment value is in one target statistical range among these statistical ranges, the processor calibrates the fingerprint sensor according to a target value corresponding to the target statistical range and an environment default value corresponding to the default environment range.

2. The electronic device according to claim 1, wherein when the initial environment value is in one target statistical range among these statistical ranges, the processor calibrates a sensed value of the fingerprint sensor according to a difference value between the target value corresponding to the target statistical range and the environment default value corresponding to the default environment range.

3. The electronic device according to claim 1, wherein the electronic device also comprises:
   a memory unit, configured to record these target statistical ranges and the target value corresponding to each target statistical range,
   wherein these categories are differentiated by one or a combination of race, sex and age.

4. The electronic device according to claim 1, wherein when the initial environment value is not in the default environment range and is not in these statistical ranges, the processor determines that the environment of the fingerprint sensor is abnormal, and the electronic device reminds a user.

5. The electronic device according to claim 1, wherein the fingerprint sensor is arranged on a power button of the electronic device.

6. A calibration method for a fingerprint sensor, including:
   when the fingerprint sensor performs initial environmental calibration, obtaining an initial environment value, and determining whether the initial environment value is in a default environment range or not;
   when the initial environment value is not in the default environment range, determining whether the initial environment value is in one of a plurality of statistical ranges or not, wherein each statistical range is obtained statistically by a plurality of fingerprint data of one of a plurality of categories; and
   when the initial environment value is in one target statistical range among these statistical ranges, calibrating the fingerprint sensor according to a target value corresponding to the target statistical range and an environment default value corresponding to the default environment range.

7. The calibration method according to claim 6, the step of calibrating the fingerprint sensor including:
   calibrating a sensed value of the fingerprint sensor according to a difference value between the target value corresponding to the target statistical range and the environment default value corresponding to the default environment range.

8. The calibration method according to claim 6, further including:
   when the initial environment value is not in the default environment range and is not in these statistical ranges, determining that the environment of the fingerprint sensor is abnormal, and reminding a user.

9. The calibration method according to claim 6, further including:
   when the fingerprint sensor is not performing initial environmental calibration or the initial environment value has been in the default environment range, performing a routine environmental calibration procedure.

10. A fingerprint sensing device, comprising:
    a fingerprint sensor; and
    a processor, coupled with the fingerprint sensor,
    wherein when the fingerprint sensing device is started and performs initial environmental calibration, the fingerprint sensor senses an initial environment value, and the processor determines whether the initial environment value is in a default environment range or not;
    when the initial environment value is not in the default environment range, the processor determines whether the initial environment value is in one of a plurality of statistical ranges or not, wherein each statistical range is obtained statistically by a plurality of fingerprint data of one of a plurality of categories; and
    when the initial environment value is in one target statistical range among these statistical ranges, the processor calibrates the fingerprint sensor according to a target value corresponding to the target statistical range and an environment default value corresponding to the default environment range.

* * * * *